United States Patent [19]

Sowers

[11] Patent Number: 4,694,769
[45] Date of Patent: Sep. 22, 1987

[54] METHOD AND APPARATUS FOR STEPPING A SAILBOAT MAST

[76] Inventor: J. James Sowers, 3 Makanna Dr., Huntington, N.Y. 11743

[21] Appl. No.: 1,911

[22] Filed: Jan. 9, 1987

[51] Int. Cl.$^4$ .............................................. B63B 15/02
[52] U.S. Cl. ...................................... 114/90; 114/109
[58] Field of Search ...................... 114/90, 91, 93, 109, 114/223; 254/242, 252, 391

[56] References Cited

U.S. PATENT DOCUMENTS 311,605   2/1885   Pickenpack .......................... 114/109
920,930   5/1909   Dixon .................................. 254/391

Primary Examiner—Sherman D. Basinger
Attorney, Agent, or Firm—Myron Amer

[57] ABSTRACT

Stepping and tensioning of a pivotal mast by a single individual is effected by use of a coupling attached at one end to the hull and having structure for adjustable securing the free end of either the front or back stay thereto at selected length positions. The coupling includes a pulley adapted to receive a line releasably attached to the end of the stay, which when pulled by an individual causes the stay to step the pivotal mast to permit securing the stay to the coupling.

3 Claims, 8 Drawing Figures

METHOD AND APPARATUS FOR STEPPING A SAILBOAT MAST

BACKGROUND OF THE INVENTION

The present invention relates to a method and apparatus for stepping the mast of the sailboat and, in particular, to permit the mast to be stepped by a single person. By stepping is meant manually lifting the mast from a horizontal to an erect position and then holding it in said erect position.

Most small sail boats are provided with a pivotably attached mast, permitting the mast to be raised or lowered in a seemingly simple fashion. To illustrate, attention is drawn to FIG. 1 of the accompanying drawings in which the mast 10 of a sailboat 12 is mounted so that its lower end is pivotable in a footing 14 so that it may be raised for running at sea, or lowered during foul weather or when in port. The raised mast 10 is supported by a headstay 16 which slants towards the bow 18 of the boat, a pair of side stays 20 and a backstay 22 which slants toward the aft of the boat and which is normally tied to the transom 24 through a bridal 26 and a tensioning device 28. In this condition, the mast is maintained upright with a proper degree of sag so that when the sail is under load, the sail will properly fill with air without breaking the mast.

In U.S. Pat. No. 4,224,890 a complex tensioning system for maintaining the backstay 22 under control is disclosed. In this patent, the backstay 22 is fixedly connected to a yoke from which a triangular bridle cable extends at an angle and is secured to the boat transom. Tension is variably applied to the bridle cable by an array of sheaves and pulleys which modify the angle at which the bridle cable extends so as to vary the distance between the yoke and the transom and thereby modifying the tension on the backstay. A simpler system, in common use today, is illustrated in FIGS. 2-4 of the accompanying drawings. In this system, the end 30 of the backstay is provided with an eyelet fitting 32 (or a thimble splice) while the bridle cable 26 comprises a single length of rope or wire on which is secured one end 34 of a clevis bracket 36 having elongated parallel arms 38 each provided with a series of aligned paired holes 40 through one pair of which a retaining pin 42 passes being removably held thereon by a releasable cotter pin 44, the backstay being first placed over the pin 42. By selecting a predetermined pair of holes 40, through which to place the retaining pin 42, the length of the backstay may be adjusted and the mast held under selected tension, relative to the forestay and the side stays, respectively.

In either of the aforementioned systems, as well as any other known prior art systems, at least two people are required to step the mast and attach it to the transom. At least one person must lift and hold the mast, and at least one person must affect the attachment of the backstay to the yoke or bridle or rail transom. Thus, even the smallest boat requires a crew of two persons, each having to exert considerable effort in carrying out the stepping and tying of the mast and the tying of the backstay. Furthermore, the stepping of the mast is made independently of the tensioning of the backstay which must be effected as a separate step after the mast is raised.

A further disadvantage of the known system lies in the fact that the tension on the mast cannot be easily adjusted once the mast is raised since again two persons are necessary, one to uncouple the backstay from the clevis bracket, the other to at least hold the mast in its upright position against falling down. This is necessary in order to release the retaining pin and to shift the retaining pin and backstay to another of the transversely paired holes in the clevis bracket.

It is, therefore, an object of the present invention to provide a simple economical device by which the mast of a small sailboat may be stepped and its tension adjusted in a single step and by only one person.

It is another object of the present invention to provide a method and apparatus by which the mast of the sailboat can be stepped with less effort and energy than that required heretofore.

It is yet another object of the present invention to provide a method and apparatus by which the tensioning on the stay of a sailboat mast can be adjusted in situ by a single person.

These objects together with other objects and advantages will be apparent from the following disclosure.

SUMMARY OF THE INVENTION

According to the present invention, apparatus is provided support to enable the stepping and tensioning of a pivotal sailboat mast by a single individual. In a sailboat of the type illustrated in FIG. 1 it will be understood that the mast is normally arranged with a pair of fixed length side stays and with either the front or back stay of fixed length. The stay selected to hold erect the mast is provided with a coupling attached at one end to the boat and has means for adjustably securing the end of the selected stay to it. The coupling includes a pulley adapted to receive a pull cable releasably attached to the end of the stay. After the mast is raised manually, the pull cable is adapted to be pulled by a single individual causing the stay to be pulled in the same line resulting in the holding erect and tensioning of the mast. The coupling is provided with means by which the stay is secured thereto once the mast is stepped and properly tensioned. The pulley line may thereafter be removed and/or tied down out of the way of the operation of the sailboat but ready for later use to readjust or retension the stay.

According to the present invention, the method for securing and stepping the sailboat mast is simplified. In the present method, the mast is partially secured in place by its fixed length stays, even in its lowered position and the stepping stay is effected soley by manipulation of the pull cable which is threaded over a pulley. By providing the end of the stepping stay with releasable hooks or other releasable attaching means, the stay may be easily pulled and tensioned and set in place within the coupling and then the pull cable released therefrom.

Full details of the present invention are set forth in the following description and in the drawings attached hereto.

DESCRIPTION OF THE INVENTION

Figure 1:
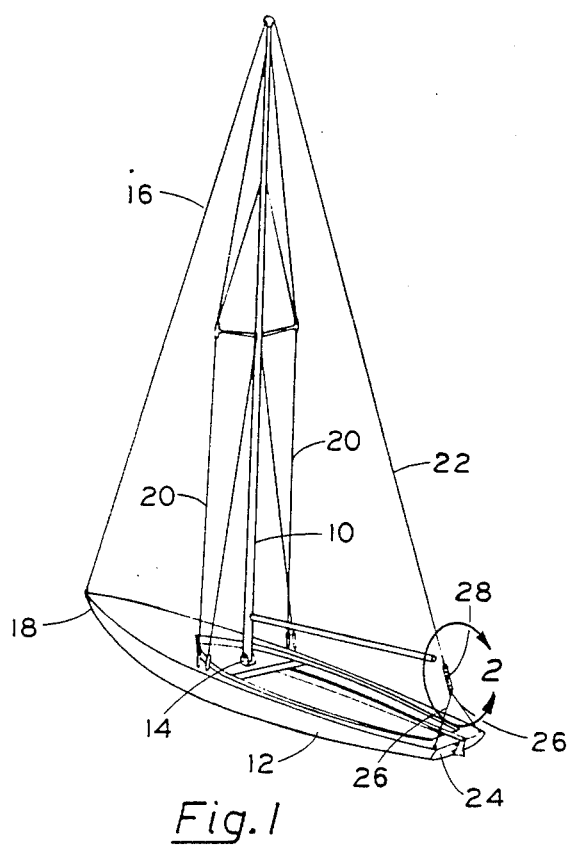
FIG. 1 is a perspective view of a sailboat showing in general the manner by which its mast is supported.
Figure 2:
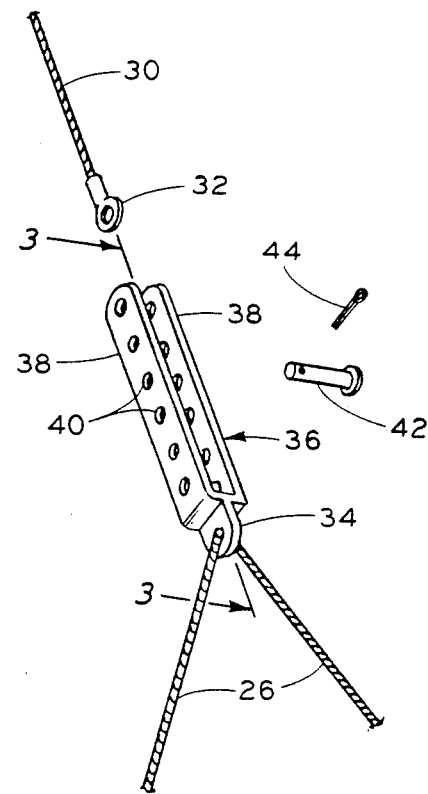
FIG. 2 is an enlarged view of an unassembled coupling device of the prior art.
Figure 3:
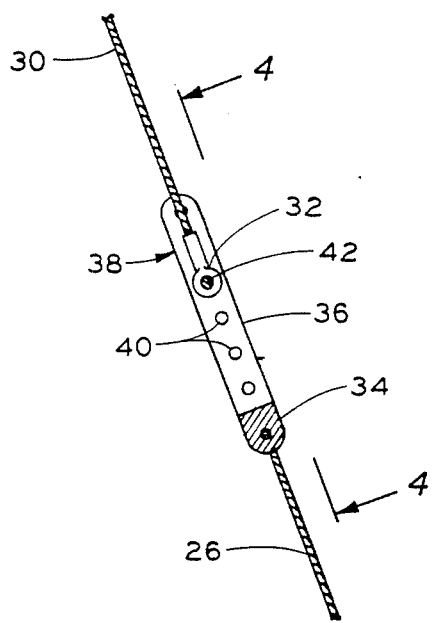
FIG. 3 is a view of the prior art coupling device taken in the direction of line 3—3 of FIG. 2.
Figure 4:
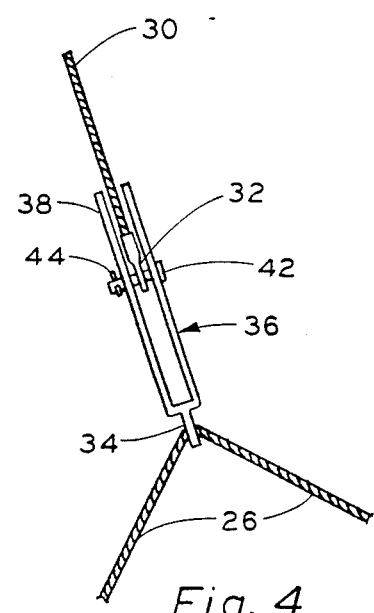
FIG. 4 is a view taken in the direction of line 4—4 of FIG. 3.
Figure 5:
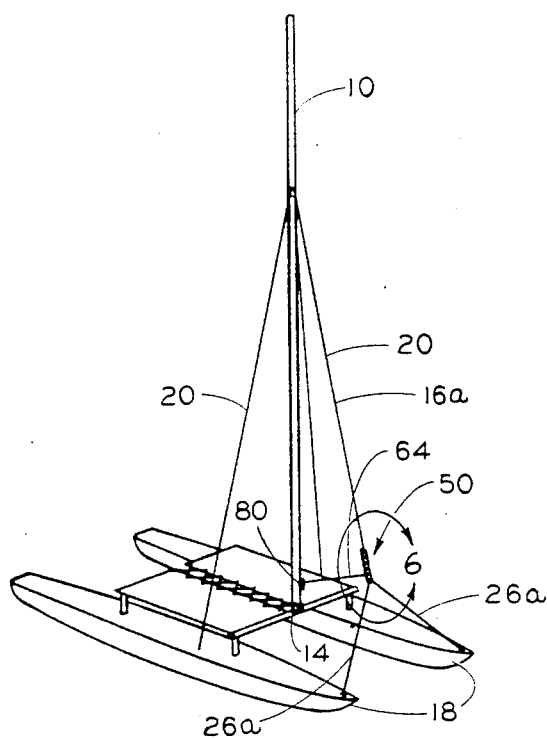
FIG. 5 is a perspective view of a catamaran showing the application of the present invention thereon.

Before turning to a description of the present invention, it is to be noted that the invention is illustrated as being applied to a sail boat such as the catamaran known by the tradename HOBIECAT, having its mast lowered aft and being raised by its forestay. It will, of course, be obvious that the invention may equally be applied to the mast of other boats, and the mast which are lowered to the fore and raised by a backstay.

Turning now to FIGS. 5 through 8, the present invention comprises a bifurcated coupling bracket or clevis 50 having certain similar features to those on the coupling bracket 34 shown in FIGS. 1-4. In common with the bifurcated coupling bracket 34, shown in FIGS. 1-4, bracket 50 is provided with a pair of parallel elongated arms 52 each having holes 54 mutually spaced therealong to provide transversely aligned pairs all lying along a longitudinal plane in which the centers of the holes are located. The clevis is also provided with an apertured tab end 56 for connection to a bridle cable 26a, the two ends of which extend at an angle to each other and are fastened to the respective catamaran hulls.

In accord with the present invention, each of the arms 52 of the clevis 50 is enlarged along its lower edge to form bosses 58 adjacent the end 56 and within which is mounted a fixed axle 60 on which a freely rotatable pulley 62 is journalled. In the illustrated embodiment, the axis of the axle 60 lies parallel to the plane containing the paired holes 54, but below this plane a distance so that the upper run of the pulley 60 is coplanar with the loci of the centers of each of the holes 54. Entrained over the pulleys 60 is pull cable 64, preferably formed of fibre or plastic rope or cable having fixed at one end a hook 66, preferably a snap hook and extending an indefinite distance at its opposite end after passing over the pulley 62. The hook 66 at the end of the pull cable 64 is adapted to engage the end of the forestay 16a which unlike the conventional forestays is provided at its end with a fixed eyelet fitting generally indicated by the numeral 68 having a pair of eyelets 70 and 72 arranged in tandom along the axis of the forestay 16a but rotated relative to each other 90 degrees. The coupling of the present invention is similarly provided with a retaining pin 74 adapted to pass through any of the aligned pairs of holes 54 and capable of being retained therein by a cotter pin 76. Instead of eyelet fitting 68 as just described, the conventional stay and fitting need not be modified, and the pull cable can be merely releasably tied thereto, and the single person method now to be described still readily accomplished.

That is, with the pull cable 64, the mast is capable of being stepped by a single individual without undue difficulty. In operation, the mast 12, which is stowed in the horizontal lowered position aft, initially rigged with the backstay 22 and the sidestays 20 in predetermined length so that when the mast is raised, they are automatically placed under the ultimately desired tension. The forestay 16a, however, remains rigged only at its upper end where it is attached to the mast and lies freely so that the end fitting 68 is freely available to the user. The user, preparatory to manually lifting the mast attaches the hooked end 66 of the pull cable 64 to the outermost eyelet 72 of the backstay fitting 68 while maintaining the pull cable 64 loosely so that it can be manipulated without any difficulty. Whereupon, after the mast is lifted, the user pulls the free end of the pull cable 64 causing the line to run over the pulley 60, pulling the forestay 16a with it, ultimately putting sufficient tension on the forestay 16a causing it to hold the mast in an erect position for sailing.

Figure 6:
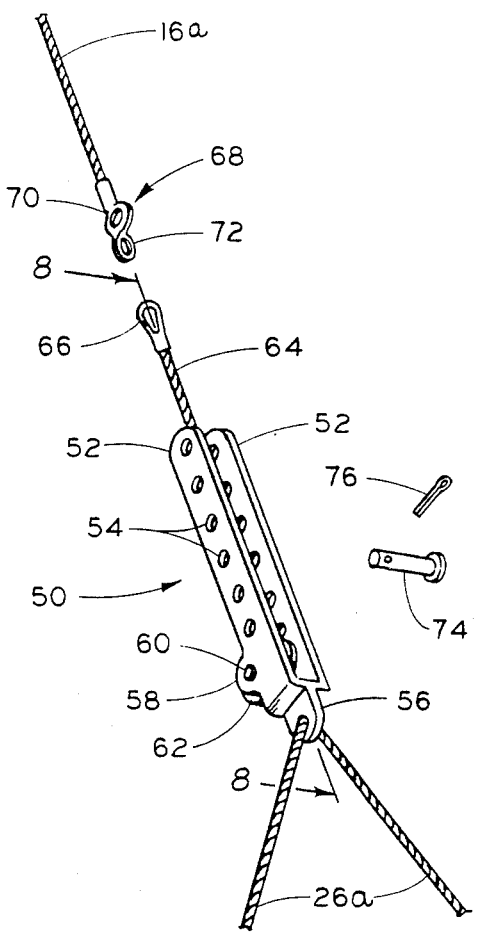
FIG. 6 is a view similar to that of FIG. 2 showing in detail the apparatus of the present invention.
Figure 7:
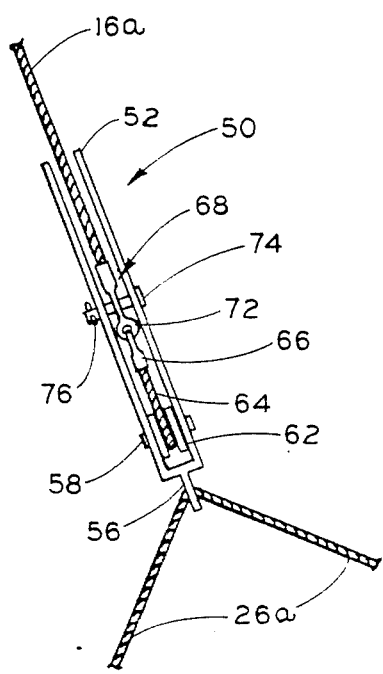
FIG. 7 is a view taken along line 7—7 of FIG. 6.

Again, referring to the clevis 50 of FIG. 6, it will be noted that because the two eyelets 70 and 72 in the end of the fitting 78 are set at 90 degrees to each other, the snap hook 66 at the end of the pull cable 64 causes the end most eyelet 92 to be moved through the spaced arms 52 of the clevis substantially parallel to and within the plane in which the holes 54 of located, as seen in FIGS. 6 and 7. This causes the perpendicularly directed eyelet 70 to pass thorugh the spaced arms 52 in transverse registry with the successively arranged pairs of holes 54. In such registry, the locking pin 74 is capable of being passed not only through the holes of 54 but through the eyelet 70 at the end of the forestay 16a. By selective pulling on the pull cable 64, the user can cause the eyelet 70 to register with any one of the paired holes 54 and so fix the forestay under selected tension. Once the locking pin 74 is inserted through the eyelet 70, the forestay 16a remains in fixed condition and the user may then release his grip on the pull cable. The pull cable may be removed, or it may be stowed out of the way.

Figure 8:
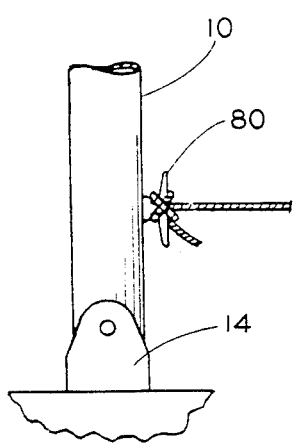
FIG. 8 is a view taken in the direction of line 8—8 of FIG. 7.
Figure 8:
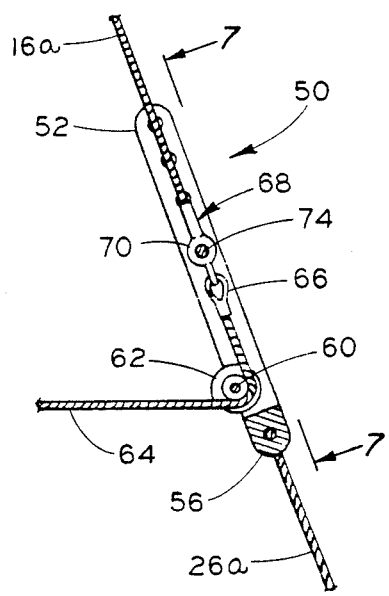

In practice, a cleat 80 is provided on the mast itself as shown in FIG. 8 whereby the free end of the pull cable may be secured so that the user is relieved of holding the pull cable and can then use both hands in securing the end of the forstay 16a to the bracket 50 using the pin 74.

Readjustment of the tension on the mast can be easily made by first reattaching the pull cable, removing the retaining pin 74 and allowing the pull cable 64 to slacken, thereafter pulling on the pull cable so that the eyelet 70 comes into registry with adjacent or remote one of the pairs of holes 54 wherein the locking pin 74 is again replaced.

It will be seen from the foregoing that the method of completing the securement in place of a raised sailboat mast is easily provided by merely attaching the pull cable to the free end of the forestay or (backstay on another boat) which is attached to the opposite end of the mast. The pull cable is threaded about a sheave rotatably disposed at the end of a stay adjustable coupling bracket of the type having an opening at one end and being tied at its other end to the transom. The bracket is provided with a plurality of aligned pairs of openings spaced therealong from the remote opening to the sheave so that appropriate tension on the backstay to hold the mast erect is accomplished by pulling simultaneously on the pull cable and moving the end of the stay to a position adjacent one of the pairs of aligned openings and fixing the end of the stay at the aligned opening with a connector member projecting through the aligned openings thereby fixedly securing the free end of the stay. It will be further appreciated that the present apparatus not only enables the stepping of the mast and the setting of the stay in proper tensioning but provides a rather simple apparatus by which this is accomplished. The apparatus having a minimal of movable parts and the entire system may be operated by a single person.

Various changes and modifications have been suggested and others will be obvious to those skilled in the art. Thus, it is intended that the present disclosure be taken as illustrative only and not limiting of the scope of the present invention.

What is claimed is:

1. Apparatus for connecting a mast stay of a sailboat to the hull to enable the holding erect and tensioning of the mast by a single individual comprising a clevis coupling attached at one end to said hull and having a pair of parallel legs, each provided with a plurality of mutually paired holes, a retaining pin adapted to enter into a selected one of said pairs of holes, a pulley located at the bight of said coupling adjacent the connecting web of the legs, and a pull cable entrained over said pulley adapted to be releasably attached at one end to said stay whereby said line may be pulled over said pulley to cause said stay to hold said mast erect whereby said retaining pin may be located through the end of said stay and a selected pair of said holes.

2. The apparatus according to claim 1 wherein said coupling is attached to said hull by a bridle cable.

3. A method of completing the securement in place of a raised sailboat mast already partially secured in place by side stays connected between said sailboat and the top of said mast, said method comprising the steps of detachably connecting a pull cable to the free end of a stay attached at its opposite end to the top of said mast, threading said pull cable about a sheave rotatably disposed at an end of a stay adjustor of the type having an opening thereinto at a remote end and plural aligned pairs of openings spaced therealong from said remote end to said sheave, simultaneously adjusting to an appropriate tension said stay to hold erect said mast by pulling on said pull cable and moving said pull cable attached end of said stay to a position adjacent one of said stay adjustor pairs of aligned openings and establishing an attachment to said positioned stay end with a connector projected through said pair of aligned openings afterwhich said pull cable is detached therefrom, whereby said sailboat mast and said raised condition is secured in place by said stay.

* * * * *